(12) United States Patent
Martin

(10) Patent No.: US 7,390,126 B2
(45) Date of Patent: Jun. 24, 2008

(54) ZERO RADIAL PLAY IDLER ARM BRACKET BEARING

(75) Inventor: Ernest E. Martin, South Bend, IN (US)

(73) Assignee: Affinia Group Inc., Ann Arbor, MI (US)

( * ) Notice: Subject to any disclaimer, the term of this patent is extended or adjusted under 35 U.S.C. 154(b) by 227 days.

(21) Appl. No.: 11/006,269

(22) Filed: Dec. 7, 2004

(65) Prior Publication Data
US 2006/0133892 A1 Jun. 22, 2006

(51) Int. Cl.
*F16C 17/03* (2006.01)
(52) U.S. Cl. .............................. 384/309; 384/125
(58) Field of Classification Search ................ 384/125, 384/309, 312, 140; 403/165; 267/276, 293
See application file for complete search history.

(56) References Cited

U.S. PATENT DOCUMENTS

| | | | |
|---|---|---|---|
| 3,361,459 A | 1/1968 | Marquis et al. | |
| 4,914,777 A * | 4/1990 | Cartellone | 15/182 |
| 5,013,166 A * | 5/1991 | Domer | 384/220 |
| 5,272,933 A | 12/1993 | Collier et al. | |
| 5,421,655 A * | 6/1995 | Ide et al. | 384/99 |
| 5,489,155 A * | 2/1996 | Ide | 384/117 |
| 5,529,420 A | 6/1996 | Henkel et al. | |
| 5,607,249 A | 3/1997 | Maughan | |
| 5,664,888 A * | 9/1997 | Sabin | 384/10 |
| 6,146,045 A | 11/2000 | Maughan | |
| 6,371,682 B1 | 4/2002 | Maughan | |
| 7,077,573 B2 * | 7/2006 | Suh et al. | 384/125 |

FOREIGN PATENT DOCUMENTS

GB 2 074 696 * 11/1981

* cited by examiner

*Primary Examiner*—William C Joyce
(74) *Attorney, Agent, or Firm*—Honigman Miller Schwartz & Cohn LLP

(57) ABSTRACT

An idler arm bracket bearing includes a plurality of inwardly extending fingers to contact the bracket. The fingers deflect toward the bearing body as the fingers contact the bracket, thereby ensuring a full contact fit that provides a tighter joint assembly. Rib members are located between the fingers to center the bracket and limit the resilient deflection of the fingers.

24 Claims, 3 Drawing Sheets

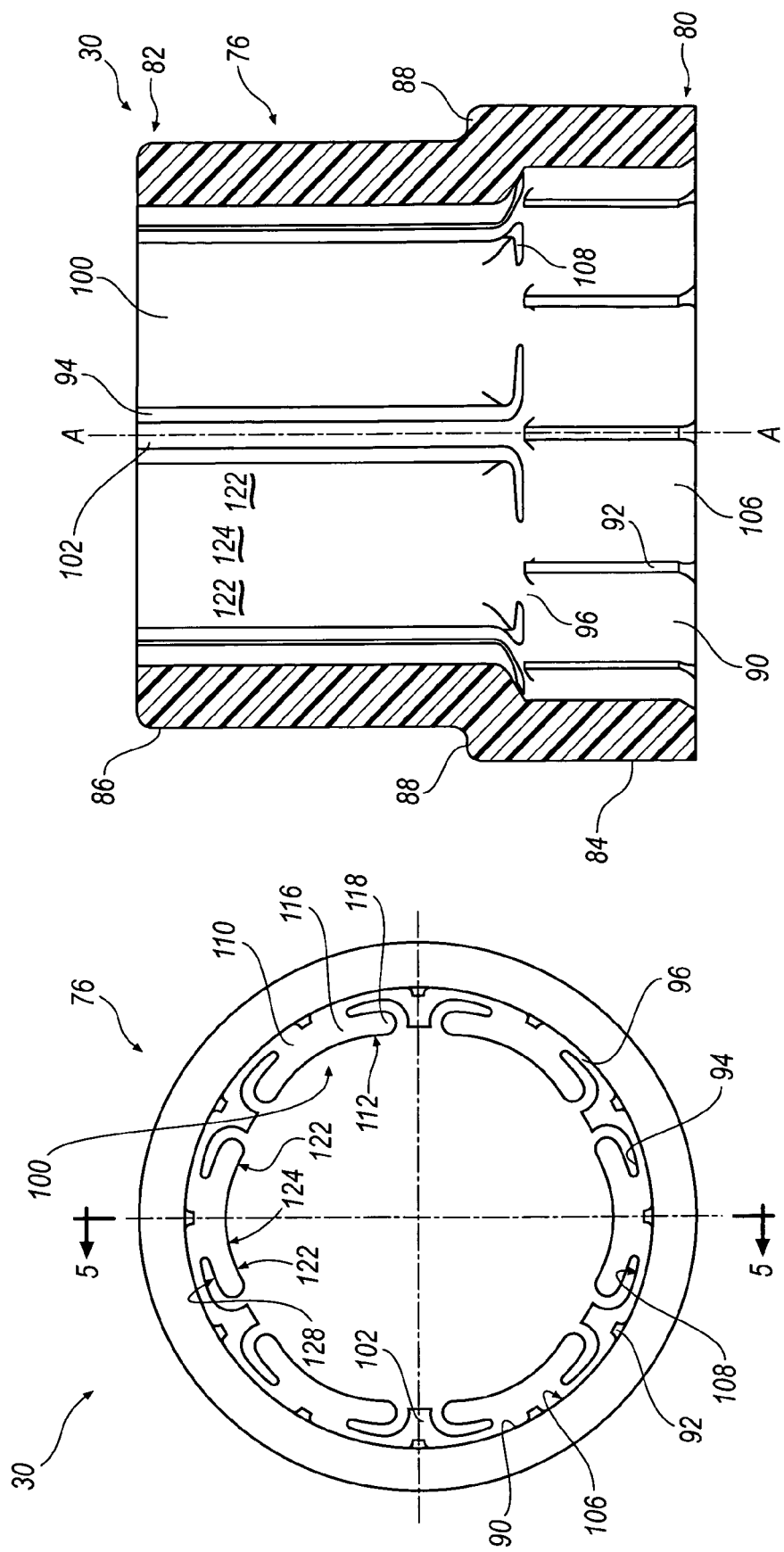

ZERO RADIAL PLAY IDLER ARM BRACKET BEARING

TECHNICAL FIELD

The present invention relates generally to socket joints, and more particularly to socket joints that permit rotation of brackets and studs, but resist relative radial displacement and misalignment.

BACKGROUND OF THE INVENTION

Non-articulating joints are applicable to a wide range of applications, including Pitman-idler arms used in steering linkages of automotive vehicles. Exemplary joints are found in commonly-owned U.S. Pat. Nos. 5,607,249, 6,146,045 and 6,371,682, to Maughan, the disclosures of which are hereby incorporated by reference in their entirety. Such joints typically include a cylindrical housing member adapted to receive a bearing together with a portion of a stud or bracket. The bearing reduces the amount of friction between the housing and the bracket while frequently adapting for wear induced looseness between the stud and housing members.

Such joints have critical manufacturing features. Typically, the stud head or bracket end must be precisely machined to ensure an adequately tight joint. Further, the stud head or bracket end must be forced into the bearing. Even with such tolerances, some bearings have an undesirable looseness after assembly, particularly when very rigid, stiff, inelastic materials are used. One way to tighten the joint is to lower manufacturing tolerances of the bearing, bracket, and socket assembly. However, some looseness may be experienced with lower tolerances, manufacturing costs may increase, and wear within the joint will increase the looseness.

What is needed, therefore, is an improved idler arm socket joint that forms a tighter assembly without requiring more costly manufacturing methods.

SUMMARY OF THE INVENTION

The present invention overcomes the deficiencies of the prior art by providing a bearing that affords a tighter assembly. In one exemplary embodiment, the bearing for a non-oscillating joint includes a hollow first portion having a first diameter defined, at least in part, by a first surface and a hollow second portion having a second diameter defined, at least in part, by a second surface. The second diameter is larger than the first diameter. The bearing further includes a plurality of finger members positioned on the first surface of the first portion so as to extend inwardly toward the axis.

In another exemplary embodiment, the non-articulating joint assembly includes a bearing having a body that includes a first end, a second end, and a surface having a plurality of fingers extending circumferentially therefrom. The fingers are defined, at least in part, by a proximal end and a distal end, where the proximal end of each finger is closer to the body than a contacting surface of the distal end. The joint assembly further includes a bracket having a cylindrical end rotatably coupled to the bearing, where the fingers contact the cylindrical end.

In yet another exemplary embodiment, the bearing for a non-articulating joint assembly includes a body having a first end, a second end, and an inner surface having a plurality of fingers extending circumferentially therefrom, wherein said fingers are defined, at least in part, by a proximal end and a distal end, where the proximal end of the fingers is closer to the body than a contacting surface of the distal end.

BRIEF DESCRIPTION OF THE DRAWINGS

FIG. 4 is an enlarged bottom view of the bearing of FIG. 2.

FIG. 5 is a sectional view taken along line 5-5 of FIG. 4.

DESCRIPTION OF THE PREFERRED EMBODIMENT

Figure 1:
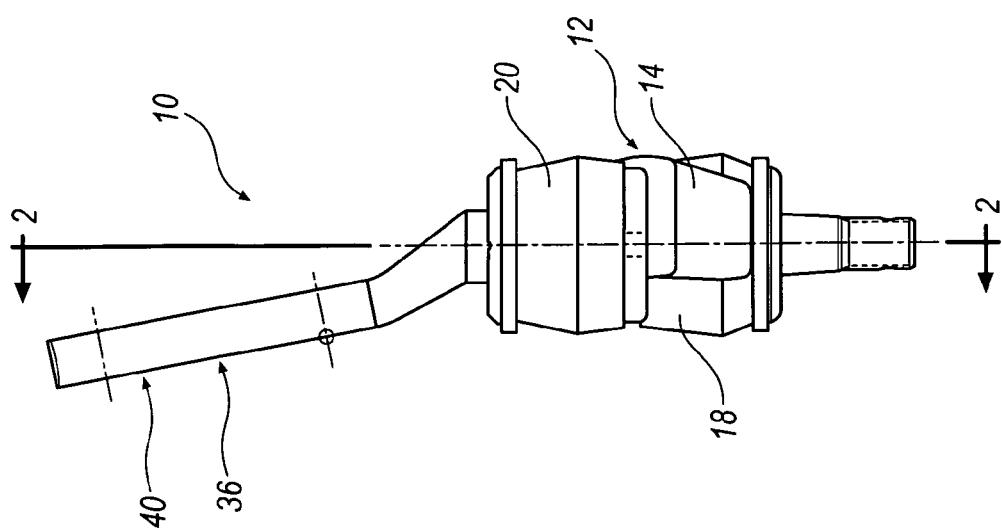
FIG. 1 is a side view an idler assembly in accordance with an embodiment of the present invention.

Referring to FIG. 1, an idler assembly 10 is illustrated to include an idler arm 12 having a central body 14 interconnecting a stud assembly 18 and a non-oscillating joint assembly 20.

Figure 2:
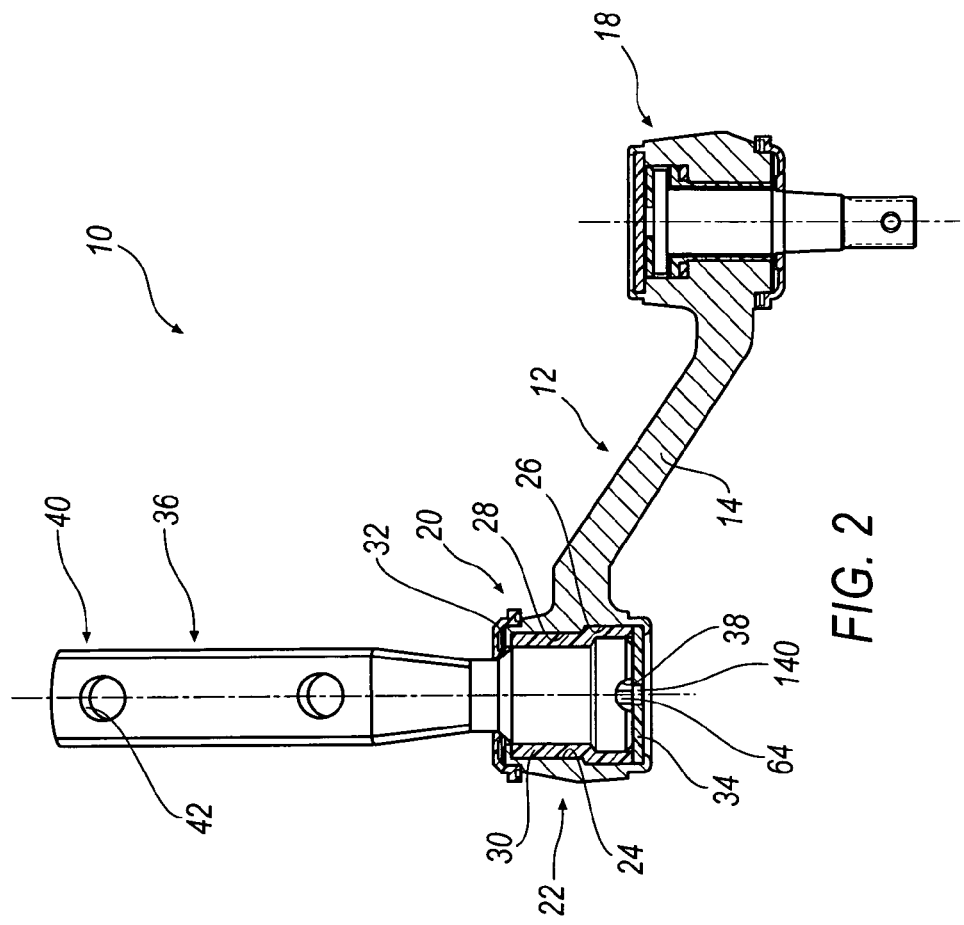
FIG. 2 is a partial sectional view of the idler assembly of FIG. 1, illustrating an embodiment of a non-articulating joint assembly according to the present invention.

Referring now to FIG. 2, an embodiment of the joint assembly 20 in accordance with the present invention is illustrated to include a generally metallic socket member 22 having a housing 24 with a first bore 26 adjacent one axial end of socket member 22 and a second bore 28 adjacent a second distal end of socket member 22. Joint assembly 20 is illustrated to further include a bearing 30 positioned within socket member 22, a boot 32, a cover 34, a mating component, or bracket, 36 partially positioned within bearing 30, and a spring 38.

Figure 3:
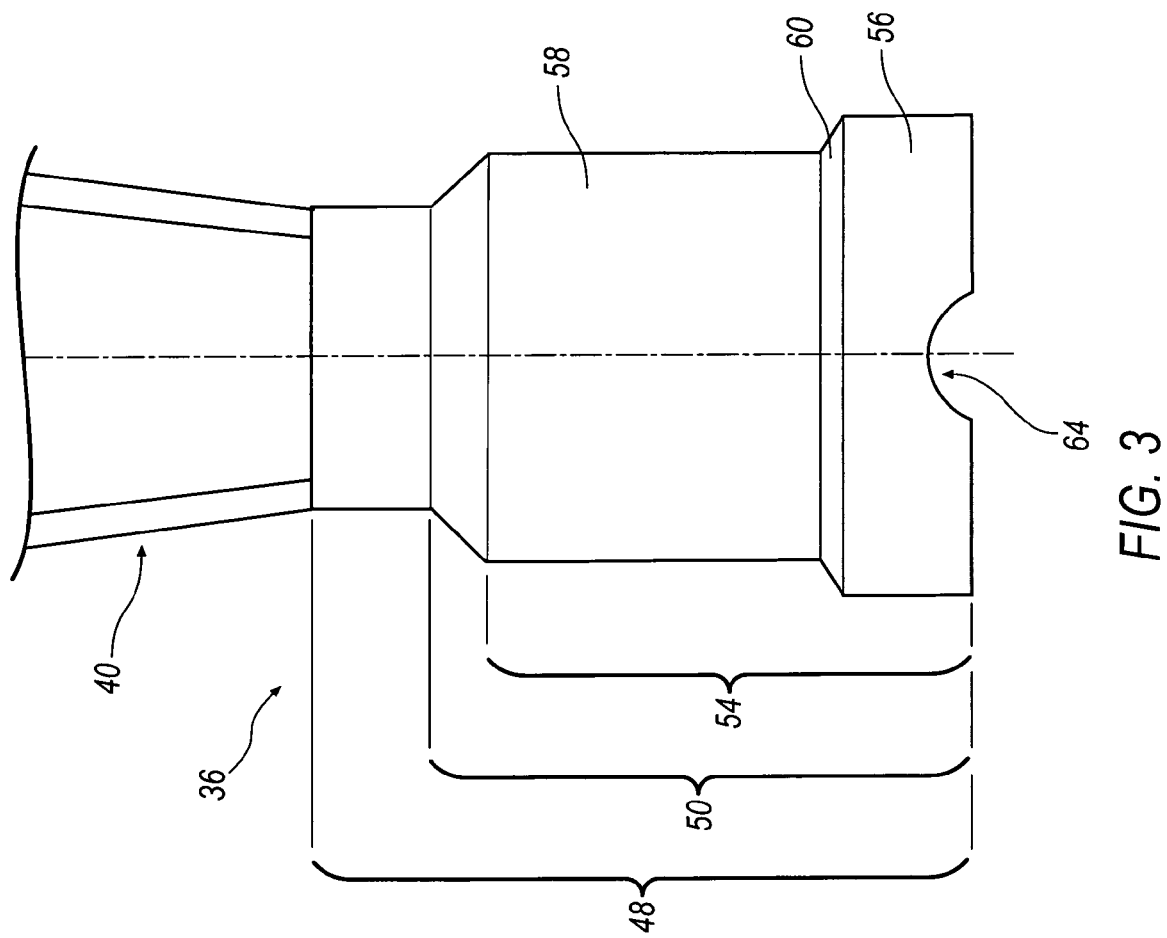
FIG. 3 is an enlarged side view of a portion of the bracket of FIG. 2

With reference to FIGS. 2 and 3, the bracket 36 has a generally concave bracket mounting portion 40 that includes a number of openings 42 that allow attachment of bracket 36 to a vehicle frame (not shown) using conventional fastening techniques. A rotational end 48 of bracket 36 is defined by a generally cylindrical end portion 50. End portion 50 includes a bearing mating portion 54 that includes a first mating surface 56, a second mating surface 58, and a tapered mating surface 60 that extends between the first mating surface 56 and the second mating surface 58. As illustrated, first mating surface 56 defines a larger diameter about end portion 50 than the diameter defined by second mating surface 58. A spring pocket 64 is formed in rotational end 48. Together, bearing 30 and bracket 36 are relative rotational components of joint assembly 20.

Spring 38 is preferably a conical telescopic compression spring and serves to maintain axial pre-load on bracket 36 and bearing 30, to be explained in further detail below.

With reference to FIGS. 4 and 5, an exemplary embodiment of bearing 30 is illustrated in greater detail. Bearing 30 includes a body 76 having a cover end 80, a housing end 82, a first outer surface 84 with a first outer diameter, a second outer surface 86 with a second outer diameter, and a transition outer surface 88 that extends radially between the first outer surface 84 and the second outer surface 86. A first inner diameter 90 of bearing 30, adjacent first outer surface 84, has a multiplicity of ribs 92 formed thereon and extending radially inwardly. A second inner diameter 94 is adjacent second outer surface 86. A transition inner surface 96 extends between the first inner diameter 90 and the second inner diameter 94 and is generally adjacent transition outer surface 88. Second inner diameter 94 has finger members 100 and rib members, or protrusions, 102 formed thereon and extending radially inwardly. First inner diameter 90 is defined, at least in part, by a first surface 106. Second inner diameter 94 is defined, at least in part, by a second surface 108.

As best seen in FIG. 4, finger members 100 include a finger body 110 that extends from second inner diameter 94 having a pair of fingers 112 extending radially inwardly and circumferentially with respect to the axis A-A of bearing 30. Fingers 112 have a proximal end 116, a distal end 118, a contacting surface 122, a body surface 124, and a leeward surface 128. The proximal end 116 is defined, in part, by the body surface 124. The distal end 118 is defined, at least in part, by the contacting surface 122 and the leeward surface 128. As illustrated without a bracket inserted therein, the contacting surface 122 adjacent the distal end 118 is closer to the axis A-A of bearing 30 than the body surface 124 adjacent the proximal end 116. As discussed below, finger members 100 contact the second mating surface 58 of bracket 36 to provide a tight fit for joint assembly 20. As best seen in FIGS. 4 and 5, the outline of fingers 112 taken normal to axis A-A is generally the same along the axial length of fingers 112.

Finger body 110 provides a longitudinally extending attachment between fingers 112 and body 76 to allow the distal ends of fingers 112 to displace radially as rotational end 48 of bracket 36 is positioned within bearing 30, as discussed below. Bearing 30 is preferably formed of Nylon® and even more preferably formed of Nylatron® GS, although any suitable bearing material that may be resiliently biased may be used.

Referring again to FIG. 2, cover 34 is received in housing 24. Cover 34 is sized to have an outer diameter that is substantially equal to the diameter of first bore 26. Cover 34 further includes a lubrication aperture 140 extending therethrough. Lubrication aperture 140 is positioned substantially in the center of cover 34 and aligns with lubricant well 64. A more detailed discussion of conventional aspects of this embodiment, such as lubricant well 64, cover 34, and spring 38 can be found in the above referenced U.S. Pat. No. 6,371,682. As described below, the cylindrical bearing mating portion 54 is coupled to bearing 30 for rotation therebetween. Bracket 36 rotates in a generally concentric arrangement within bearing 30. Any deviation from concentric alignment of bracket 36 and bearing 30, or oscillation, is reduced by the interference fit between fingers 112 and second mating surface 58.

To assemble joint assembly 20, bearing 30 is fully inserted axially into housing 24. The bracket mounting portion of bracket 36 is inserted through cover end 80 of bearing 30. Bracket 36 is inserted through bearing 30 until tapered mating surface 60 contacts transition inner surface 96. As second mating surface 58 is inserted concentrically into second inner diameter 94 of bearing 30, fingers 112 contact second mating surface 58 in an interference fit. This interference fit requires less insertion force than is required to insert a bracket into many conventional close tolerance bearings. The distal ends 118 of fingers 112 displace radially, away from the axis A-A of bearing 30 and toward second inner diameter 94 of body 76. In this manner, fingers 112 are resiliently biased with at least a portion of contacting surface 122 tangential to second mating surface 58 and at least a portion of finger 112 adjacent contacting surface 122 in tension. This tension in a portion of each finger 112, coupled with other stresses experienced by fingers 112 and finger members 100, creates a force that retains bracket 36 and bearing 30 in a concentric arrangement, thereby reducing any relative oscillation in joint assembly 20 during operation of idler assembly 10.

As best seen in FIG. 4, protrusions 102 and ribs 92 center bracket 36 in bearing 30. Protrusions 102 also limit the deflection of fingers 112. Protrusions 102 and ribs 92 need not be as precisely machined as ribs of other bearings that are intended to provide the only contacting surfaces between a bearing and a bracket. The flexibility of fingers 112 allow bearing 30 to be machined with a wider tolerance than conventional bearings. In this manner, bearing 30 provides a tighter fit for joint assembly 20 while alleviating the need to machine bearing 30 to a tighter tolerance. As bearing 30 wears due to contact with bracket 36, fingers 112 are kept in a tight-fitting contact with second mating surface 58 due to the bias induced when bracket 36 was inserted into bearing 30.

As best seen in FIG. 2, spring 38 is positioned adjacent the rotational end 48 of the bracket 36 and the cover 34 is positioned within first bore 26 and adjacent the rotational end 48, resiliently biasing spring 38. As illustrated, a portion of socket member 22 is mechanically distorted to retain cover 34 in a desired position.

Transition inner surface 96 and tapered mating surface 60 interact in part to prevent relative axial movement between bearing 30 and bracket 36. For applications where relative axial movement is desired, or of no import, transition inner surface 96 and tapered mating surface 60 can be eliminated to provide a further embodiment of the joint assembly of the present invention.

While the invention has been described with respect to specific examples including preferred modes of carrying out the invention, those skilled in the art will appreciate that there are numerous variations and permutations of the above described systems and techniques that fall within the spirit and scope of the invention as set forth in the appended claims. For example, fingers 112 and protrusions 102 may extend from bracket 36 and bearing 30 may define a cylindrical mating surface that contacts fingers 112.

What is claimed is:

1. A bearing for a non-oscillating joint extending along a central longitudinal axis of rotation, comprising:
   a first portion defined by a first diameter and a first surface;
   a second portion defined by a second diameter and a second surface;
   a plurality of radially displaceable finger members extending radially inward toward said axis from said second surface of said second portion; and
   a plurality of rib members extending radially inward toward said axis from said second surface;
   wherein the first diameter is different from the second diameter; wherein the first portion is axially offset from the second portion.

2. The bearing of claim 1 further including a plurality of ribs extending radially inward toward said axis from said first surface.

3. The bearing of claim 1 wherein said rib members are interposed between at least a portion of said finger members.

4. The bearing of claim 1 wherein said finger members extend circumferentially with respect to said axis.

5. The bearing of claim 4 wherein the cross section of said circumferential extension of said first portion and said finger members normal to said axis is defined by a generally consistent outline relative said axis.

6. The bearing of claim 1 wherein said finger members are selectively adapted to be resiliently biased away from said axis.

7. The bearing of claim 1 wherein each of said finger members are defined, at least in part, by:
   proximal end,
   a distal end,
   a contacting surface,
   a body surface, and
   a leeward surface, wherein said distal end is defined by the contacting surface and the leeward surface, wherein the contacting surface is radially closer to said axis than said leeward surface, wherein the proximal end is defined by the contacting surface.

8. The bearing of claim 1, wherein said first and second portions are defined by a body, wherein the body is hollow, wherein the hollow body is defined by the first surface and the second surface, wherein the first surface and the second surface define, respectfully, the first diameter and the second diameter.

9. The bearing of claim 8, wherein said first diameter is larger than said second diameter.

10. A bearing for a non-oscillating joint extending along a central longitudinal axis of rotation, comprising:
   a first portion defined by a first inner surface;
   a second portion defined by a second inner surface; and
   a plurality of finger members extending radially inward toward said axis from said second inner surface of said second portion, wherein said fingers are defined, at least in part, by
      a proximal end, and
      a distal end; and
   a plurality of rib members extending radially inward toward said axis from said second inner surface;
   wherein the first inner surface is axially offset from the second inner surface.

11. The bearing of claim 10, which each of said finger members is further defined to include:
   a body surface,
   a contacting surface, and
   a leeward surface.

12. The bearing of claim 11, wherein the proximal end is defined by the contacting surface, wherein said distal end is defined by the contacting surface and the leeward surface, wherein the contacting surface is radially closer to said axis than said leeward surface.

13. The bearing of claim 10 further including a plurality of ribs extending radially inward toward said axis from said first inner surface.

14. The bearing of claim 10, wherein said rib members are interposed between at least a portion of said finger members.

15. The bearing of claim 10, wherein said finger members extend circumferentially with respect to said axis.

16. The bearing of claim 15, wherein the cross section of said circumferential extension of said first portion and said finger members normal to said axis is defined by a generally consistent outline relative said axis.

17. The bearing of claim 10, wherein said finger members are selectively adapted to be resiliently biased away from said axis.

18. The bearing of claim 10, wherein said first and second portions are defined by a body, wherein the body is hollow, wherein the hollow body is defined by the first inner surface and the second inner surface, wherein the first inner surface and the second inner surface define, respectfully, a first diameter and a second diameter.

19. The bearing of claim 18, wherein said first diameter is larger than said second diameter.

20. A bearing for a non-oscillating joint extending along a central longitudinal axis of rotation that retains a mating component, comprising:
   means for resiliently biasing a plurality of fingers of said bearing upon inserting said mating component into said bearing; and
   means for radially displacing the plurality of fingers of said bearing upon inserting said mating component into said bearing, wherein said bearing includes an inner surface having a first inner surface defined by a first diameter and a second inner surface defined by a second diameter, wherein the first diameter is greater than the second diameter,
   wherein the first inner surface is axially offset from the second inner surface; and wherein at least one of the inner surfaces of the bearing having ribs or protrusions.

21. The bearing of claim 20, wherein the means for resiliently biasing the plurality of fingers includes a contacting surface of said plurality of fingers.

22. The bearing of claim 21, wherein the means for radially displacing the plurality of fingers includes a distal end, wherein the distal end is defined by said contact surface and a leeward surface.

23. The bearing of claim 20, wherein said plurality of fingers are circumferentially disposed on and extend from said inner surface of said bearing, wherein said plurality of fingers extend radially inwardly toward said axis, wherein said inner surface defines a passage formed in said bearing for permitting insertion of said mating component.

24. The bearing of claim 20, wherein the plurality of fingers are formed on said second inner surface.

* * * * *